(12) United States Patent
Aguilera et al.

(10) Patent No.: US 12,449,326 B2
(45) Date of Patent: Oct. 21, 2025

(54) SYSTEM AND METHOD FOR PROVIDING TACTILE SENSOR CALIBRATION

(71) Applicant: Honda Motor Co., Ltd., Tokyo (JP)

(72) Inventors: Sergio Aguilera, Atlanta, GA (US); Rana Soltani Zarrin, Los Gatos, CA (US)

(73) Assignee: Honda Motor Co., Ltd., Tokyo (JP)

( * ) Notice: Subject to any disclaimer, the term of this patent is extended or adjusted under 35 U.S.C. 154(b) by 434 days.

(21) Appl. No.: 18/071,035

(22) Filed: Nov. 29, 2022

(65) Prior Publication Data

US 2024/0094081 A1 Mar. 21, 2024

Related U.S. Application Data

(60) Provisional application No. 63/407,381, filed on Sep. 16, 2022.

(51) Int. Cl.
*G01L 25/00* (2006.01)
(52) U.S. Cl.
CPC .................... *G01L 25/00* (2013.01)
(58) Field of Classification Search
CPC ....................................... G01L 25/00
See application file for complete search history.

(56) References Cited

U.S. PATENT DOCUMENTS

2017/0284787 A1* 10/2017 Ciocarlie .................. G01L 1/18
2022/0120630 A1 4/2022 Tomo et al.

OTHER PUBLICATIONS

Karl et al., "Unsupervised preprocessing for Tactile Data", Jun. 23, 2016, arXiv: 1606.07312v1 [cs.RO], pp. 1-7 (Year: 2016).*
Sathe et al, "FingerTac—An Interchangeable and Wearable Tactile Sensor for the Fingertips of Human and Robot Hands", Oct. 13, 2023, arXiv:2310.09201v1 [cs.RO], pp. 1-8 (Year: 2023).*
De Gregorio et al., Integration of Robotic Vision and Tactile Sensing for Wire-Terminal Insertion Tasks, Apr. 2019, IEEE Transactions on Automation Science and Engineering, vol. 16, No. 2, pp. 585-598 (Year: 2019).*
Tessa J. Pannen, Steffen Puhlmann, and Oliver Brock. "A Low-Cost, Easyto-Manufacture, Flexible, Multi-Taxel Tactile Sensor and its Application to In-Hand Object Recognition". In: 2022 International Conference on Robotics and Automation (ICRA). 2022, pp. 10939-10944. doi: 10.1109/ICRA46639.2022.9811761.

(Continued)

*Primary Examiner* — Mi'schita' Henson
(74) *Attorney, Agent, or Firm* — Rankin, Hill & Clark LLP

(57) ABSTRACT

A system and method for providing tactile sensor calibration that include receiving force data from a force/torque sensor and tactile data from a plurality of taxels of a tactile sensor pad. The system and method also include interpolating the force data and the tactile data and pre-processing the interpolated data to align the force data and the tactile data to match data points. The system and method additionally include dividing the matched data points into individual interactions and computing a linear regression for each segment that is associated with each interaction. The system and method further include determining an amount of force that is absorbed by the tactile sensor pad based on a conversion of tactile measurements sensed by the plurality of taxels into Newtons based on the linear regression computed for each segment.

20 Claims, 6 Drawing Sheets

(56) References Cited

OTHER PUBLICATIONS

Zhe Su et al. "Use of tactile feedback to control exploratory movements to characterize object compliance". In: Frontiers in Neurorobotics 6 (2012). issn: 1662-5218. doi: 10.3389/fnbot.2012.00007. url: https://www.frontiersin.org/articles/10.3389/fnbot.2012.00007.

Xingru Zhou et al. "Learning to Predict Friction and Classify Contact States by Tactile Sensor". In: 2020 IEEE 16th International Conference on Automation Science and Engineering (CASE). 2020, pp. 1243-1248. doi: 10.1109/CASE48305.2020.9216788.

* cited by examiner

SYSTEM AND METHOD FOR PROVIDING TACTILE SENSOR CALIBRATION

CROSS-REFERENCE TO RELATED APPLICATION

This application claims priority to U.S. Provisional Application Ser. No. 63/407,381 filed on Sep. 16, 2022, which is expressly incorporated herein by reference.

BACKGROUND

Tactile sensors are used to measure and quantify the interaction between two surfaces. Tactile sensing may be accomplished by different modalities. One of the largest groups of tactile sensors uses a discrete distribution of taxels. When two surfaces interact, it is of interest to accurately estimate the force interaction between them. The interaction between surfaces may be in proportion to one or more taxels. Currently, individual taxel calibration is used to transform their measurements into a force reading. However, in many cases, this calibration method may not correctly measure due to the interaction over a larger proportion of one taxel, signal processing issues, unmeasured force due to sensor discretization, and/or issues with aggregation of tactile forces sensed by numerous taxels.

BRIEF DESCRIPTION

According to one aspect, a computer-implemented method for providing tactile sensor calibration is provided. The computer-implemented method includes receiving force data from a force/torque sensor and tactile data from a plurality of taxels of a tactile sensor pad. The computer-implemented method also includes interpolating the force data and the tactile data and pre-processing the interpolated data to align the force data and the tactile data to match data points. The computer-implemented method additionally includes dividing the matched data points into individual interactions and computing a linear regression for each segment that is associated with each interaction. A center of pressure of an applied force is computed based on the linear regression for each segment. The computer-implemented method further includes determining an amount of force that is absorbed by the tactile sensor pad based on a conversion of tactile measurements sensed by the plurality of taxels into Newtons based on the linear regression computed for each segment.

According to another aspect, a system for providing tactile sensor calibration. The system includes a memory storing instructions that are executed by a processor. The instructions include receiving force data from a force/torque sensor and tactile data from a plurality of taxels of a tactile sensor pad. The instructions also include interpolating the force data and the tactile data and pre-processing the interpolated data to align the force data and the tactile data to match data points. The instructions additionally include dividing the matched data points into individual interactions and computing a linear regression for each segment that is associated with each interaction. A center of pressure of an applied force is computed based on the linear regression for each segment. The instructions further include determining an amount of force that is absorbed by the tactile sensor pad based on a conversion of tactile measurements sensed by the plurality of taxels into Newtons based on the linear regression computed for each segment.

According to yet another aspect, a non-transitory computer readable storage medium storing instructions that when executed by a computer, which includes a processor performs a method. The method includes receiving force data from a force/torque sensor and tactile data from a plurality of taxels of a tactile sensor pad. The method also includes interpolating the force data and the tactile data and pre-processing the interpolated data to align the force data and the tactile data to match data points. The method additionally includes dividing the matched data points into individual interactions and computing a linear regression for each segment that is associated with each interaction. A center of pressure of an applied force is computed based on the linear regression for each segment. The method further includes determining an amount of force that is absorbed by the tactile sensor pad based on a conversion of tactile measurements sensed by the plurality of taxels into Newtons based on the linear regression computed for each segment.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
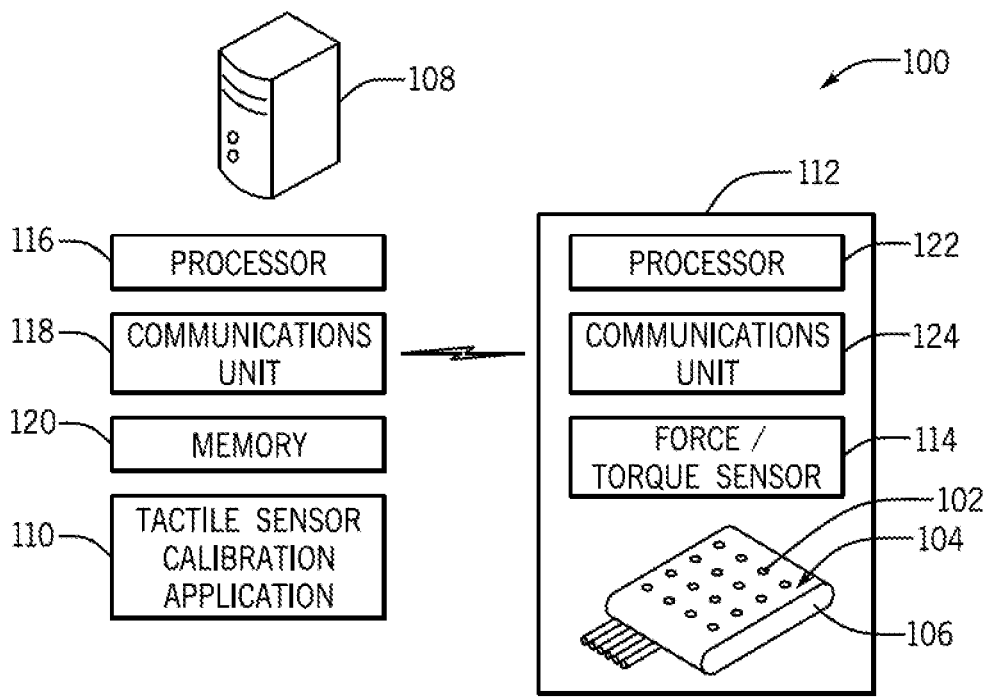
FIG. 1 is a schematic view of an exemplary operating environment 100 for providing tactile sensor calibration according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an exemplary operating environment 100 for providing tactile sensor calibration according to an exemplary embodiment of the present disclosure. The operating environment 100 includes a system that enables calibration of a plurality of taxels 102 of respective tactile sensors that may be disposed upon a tactile sensing surface 104 of a tactile sensor pad 106. The tactile sensor pad 106 may be utilized in a variety of applications. For purposes of simplicity, the tactile sensor pad 106 will be described with respect to a robotic application that may include a robot (not shown).

Figure 2:
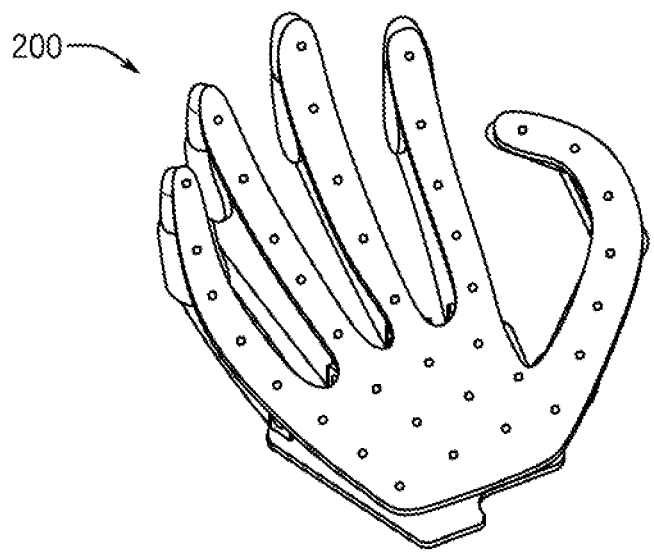
FIG. 2 is an illustrative example of a robotic hand that includes a tactile sensor pad according to an exemplary embodiment of the present disclosure.

In an exemplary embodiment, the operating environment 100 may include an externally hosted server infrastructure (external server) 108 that is configured to execute a tactile sensor calibration application 110. With reference to FIG. 1 and FIG. 2, the tactile sensor calibration application 110 may be configured to execute instructions that are utilized to complete a calibration process with respect to forces absorbed by the tactile sensing surface 104 of the tactile sensor pad 106 that may be utilized as part of a robotic hand 200. However, it is appreciated that the tactile sensor calibration application 110 may be configured to execute processes that are utilized complete a calibration process with respect to forces absorbed by the tactile sensing surface 104 of the tactile sensor pad 106 in various robotic and non-robotic applications.

As discussed in more detail below, the tactile sensor pad 106 may be disposed upon the robotic hand 200. The robotic hand 200 may be operably connected to a robotic computing system 112 that may be associated with the robot. In one embodiment, the tactile sensor calibration application 110 may be configured to communicate with the robotic computing system 112 and may receive tactile data from each of the plurality of taxels 102 of the respective tactile sensors that may be disposed upon the tactile sensing surface 104.

The tactile sensor calibration application 110 may also be configured to receive force data through the robotic computing system 112. The force data may be output by a force/torque sensor 114 (F/T sensor 114) that may be disposed upon or associated with the tactile sensor pad 106. In an exemplary embodiment, the tactile sensor calibration application 110 may be configured to use the force data that pertains to force sensed by the F/T sensor 114 as a ground truth to calibrate the forces absorbed by the tactile sensing surface 104 of the tactile sensor pad 106.

In one or more embodiments, the tactile sensor calibration application 110 may be configured analyze the tactile data received from the plurality of taxels 102 and the force data received from F/T sensor 114 that may be received at respective frequencies and time steps (e.g., different starting and ending moments). The tactile sensor calibration application 110 may be configured to interpolate and pre-process the tactile data received from the plurality of taxels 102 and the force data received from F/T sensor 114 to match and align the amount of data points. In particular, the data points may be matched and aligned with respect to frequency and time step.

As discussed below, upon interpolating and pre-processing the tactile data and the force data, the tactile sensor calibration application 110 may be configured to compute a regression that may transform the measurements of the tactile sensor pad 106 into a value that is indicative of a measured amount of force of each taxel on each direction. To account for the rotation of each of the plurality of taxels 102 upon the robotic hand 200, the tactile sensor calibration application 110 may be configured to sum all the measured forces. In one configuration, the tactile sensor calibration application 110 may be configured to analyze a sum of forces with respect to each axis of the tactile sensor pad 106 that may be utilized as part of a robotic hand 200 and may be configured to determine a total normal force in Newtons that is absorbed by the tactile sensor pad 106.

In one or more embodiments, the tactile sensor calibration application 110 may be additionally configured to compute a center of pressure of an applied force that is applied to one or more portions of the tactile sensing surface 104 of the tactile sensor pad 106. In one aspect, the computed force and center of pressure may be analyzed and computed to values that are indicative of a requisite amount of force that may be included within a pre-trained dataset that may be used to properly grasp and/or manipulate the object by the robotic hand 200.

In one configuration, the tactile sensor calibration application 110 may analyze the measured forces (e.g., in Newtons) being exerted by different portions of the tactile sensor pad 106 that may be utilized as part of the robotic hand 200 (e.g., forced being exerted by each robotic finger) and may compare the respective forces to the pre-trained dataset that pertain to a particular object to determine if forces being exerted by one or more portions of the robotic hand are to be adjusted to one or more particular levels. Upon determining if particular forces exerted by one or more portions of the robotic hand 200 are to be adjusted, the tactile sensor calibration application 110 may be configured to send one or more electronic commands to the robotic computing system 112 to electronically control the robotic hand 200 to adjust forces exerted by one or more portions of the robotic hand 200 to provide appropriate grasping and/or manipulation of the robotic hand 200 with respect to the particular object.

In an illustrative example, the tactile sensor calibration application 110 may analyze the measured forces being exerted by different portions of the tactile sensor pad 106 that may be utilized as part of the robotic hand 200 (e.g., forced being exerted by each robotic finger) and may compare the forces to the pre-trained dataset that pertain to a particular object (e.g., aluminum can) to determine if forces being exerted by one or more portions of the robotic hand 200 are to be adjusted to one or more particular levels to grasp the object. Based on the comparison of force, if the application 110 determines that particular forces exerted by one or more portions of the robotic hand 200 are to be adjusted, the tactile sensor calibration application 110 may be configured to send one or more electronic commands to the robotic computing system 112 to electronically control the robotic hand 200 to adjust forces exerted by one or more portions of the robotic hand 200 to properly grasp and/or manipulate the object. This functionality may ensure that a proper amount of force is exerted to grasp each object based on the determination of the amount of force that is absorbed by the entire tactile sensor pad 106.

It is appreciated that the functionality of tactile sensor calibration application 110 may be used for additional robotic applications in addition or in lieu of grasping and/or manipulation of objects. For example, the functionality of tactile sensor calibration application 110 may be used to determine forces that are absorbed by the tactile sensor pad 106 and to control for adjustment of forces for human-robotic interactions (e.g., human and robot handshake), robotic-environmental interactions (e.g., assembly line procedures), and additional types of applications.

The tactile sensor calibration application 110 may provide an improvement in the technology of robotic environmental interaction with respect to objects, humans, and/or environments based on pad wide calibration to enable the determination of force that is absorbed by the entire tactile sensor pad 106 that may be utilized in a robotic application, such as a robotic hand. This improvement to the technology avoids the evaluation of a taxel specific force determination that may be required to determine forces for each of the plurality of taxels to provide an accurate force determination in Newtons and to compute particular locations of applied force that may be utilized to electronically control robotic applications to for environmental manipulation.

With continued reference to FIG. 1, the external server 108 may be operably controlled by a processor 116 that may be configured to execute the tactile sensor calibration application 110. In particular, the processor 116 may be configured to execute one or more applications, operating systems, databases, and the like. The processor 116 may also include internal processing memory, an interface circuit, and bus lines for transferring data, sending commands, and communicating with the plurality of components of the external server 108.

The processor 116 may be operably connected to a communications unit 118 of the external server 108. The communications unit 118 may include one or more network interface cards (not shown) that may be configured to connect to one or more computing systems through an internet cloud (not shown). In particular, the communications unit 118 may be configured to provide secure communications between the external server 108 and the robotic computing system 112 to facilitate the communication of data between the tactile sensor calibration application 110 and the components disposed upon and associated with the tactile sensor pad 106, the robotic hand 200, and/or the robot.

In one embodiment, the processor 116 may be operably connected to a memory 120 of the external server 108. Generally, the processor 116 may communicate with the memory 120 to execute the one or more applications, operating systems, and the like that are stored within the memory 120. In one embodiment, the memory 120 may store one or more executable application files that are associated with the tactile sensor calibration application 110. In one or more embodiments, the memory 120 may be configured to store one or more pre-trained datasets (not shown) that may be populated with force values that are associated with the grasping and manipulation of an environment (e.g., robotic application within a manufacturing environment), objects (e.g., object grasping), and/or robot-human interactions (e.g., shaking hands). The pre-trained datasets may be pre-populated and updated at one or more points in time with respective force values that may be associated with requisite grasping and/or manipulation forces that may be associated with the robotic hand 200 to properly grasp and manipulate a particular object.

As discussed below, in one embodiment, upon determining the force in Newtons and particular locations of applied force upon the tactile sensor pad 106, the tactile sensor calibration application 110 may be configured to access the memory 120 of the external server 108 to retrieve and analyze one or more pre-trained datasets to query and retrieve force values (e.g., in Newtons) that may be associated with requisite grasping and/or manipulation forces to properly grasp and manipulate a particular object. The force values retrieved from the one or more pre-trained datasets may be compared against the determined force absorbed by the tactile sensor pad 106 (e.g., as computed in Newtons) to determine if forces extracted by the robotic hand 200 are to be adjusted for grasping and manipulation of the particular object that the robot is to grasp and/or manipulate. The tactile sensor calibration application 110 may thereby provide electronic commands to the robotic computing system 112 to electronically control the robotic hand 200 to adjust forces exerted by one or more portions of the robotic hand 200 to properly grasp and/or manipulate the object as determined based on the comparison of the determined force absorbed by the tactile sensor pad 106 and the retrieved force values.

As discussed, the robotic computing system 112 may be associated with the robot. The robotic computing system 112 may be operably controlled by a processor 122. In some embodiments, the processor 122 of the robotic computing system 112 may be configured to execute the tactile sensor calibration application 110. The processor 122 may also include internal processing memory, an interface circuit, and bus lines for transferring data, sending commands, and communicating with the plurality of components of the robot, the robotic hand 200, and/or the plurality of taxels 102 of respective tactile sensors and the F/T sensor 114 that may be disposed upon the tactile sensing surface 104 of a tactile sensor pad 106.

The processor 122 may be operably connected to a communications unit 124 of the robotic computing system 112. The communications unit 124 may include one or more network interface cards (not shown) that may be configured to connect to one or more computing systems through an internet cloud (not shown). In particular, the communications unit 124 may be configured to provide secure communications between the robotic computing system 112 and the external server 108 to facilitate the communication of data between the tactile sensor calibration application 110 and the components disposed upon and associated with the tactile sensor pad 106, the robotic hand 200, and/or the robot.

As shown in FIG. 2, in one configuration, the tactile sensor pad 106 may be disposed upon the entirety of the robotic hand 200. However, it is appreciated that the tactile sensor pad may be utilized with respect to various modalities (e.g., human hand, flat surface, curved surface, etc.). In one embodiment, the robotic hand 200 may be configured as including curved fingertips or flat finger tips. In alternate embodiments, the robotic hand 200 may include any number of appendages and/or may be configured in various shapes, sizes, and/or configurations.

The plurality of taxels 102 disposed upon the tactile sensing surface 104 of the tactile sensor pad 106 may be configured to measure changes in pressure, a three-dimensional displacement, and/or a magnetic field to quantify changes on the tactile sensing surface 104. In an exemplary embodiment, the tactile sensor calibration application 110 may be configured to characterize a tactile sensor base of forces applied over an area that spans several taxels and may perform a calibration based on the location of where the force is applied.

In one or more embodiments, the plurality of taxels 102 may be disposed upon the tactile sensing surface 104 in one or more array formats (e.g., 16 or 30 taxels in each array). In alternate embodiments, the plurality of taxels 102 may be disposed upon the tactile sensing surface 104 in one or more patterns that may be associated with areas of the robotic hand 200 that may be used more frequently to grasp and/or manipulate objects (e.g., curved/flat finger tips).

The plurality of taxels 102 may output tactile data to the tactile sensor calibration application 110. The tactile sensor calibration application 110 may analyze the tactile data and may be configured to characterize values measured by each of the plurality of taxels and analyze how to transform the values into a force measurement in Newtons, as discussed below. The tactile sensor calibration application 110 may accordingly electronically execute one or more methods to calibrate the tactile sensor pad 106 as a whole.

In an exemplary embodiment, the F/T sensor 114 may be configured to detect linear and rotational forces exerted upon one or more of the plurality of taxels 102. In one or more embodiments, the tactile sensor pad 106 may include various types of adapters (not shown) that may be associated with the F/T sensor 114 and the tactile sensor pad 106 to facilitate interaction between the two. The adapters may be shaped and/or sized according to the shape and/or size of the tactile sensor pad 106. In one configuration, the tactile sensor pad 106 may include a large F/T sensor adapter which may cover all of the plurality of taxels 102 of the tactile sensor pad 106. In another configuration, the tactile sensor pad 106 may include a small F/T sensor adapter which may cover a smaller (e.g., 2×2) taxel size. In yet another configuration, the tactile sensor pad 106 may include a single F/T sensor adapter which may cover over a single taxel.

In one configuration, the F/T sensor 114 may be pressed against one or more of the plurality of taxels 102. Accordingly, since the F/T sensor 114 may be pressed against one or more of the plurality of taxels 102, force data output by the F/T sensor 114 may be analyzed by the tactile sensor calibration application 110 to determine a sum of forces on each axis of the tactile sensor pad 106. In one configuration, an 80° angle of press force between the F/T sensor 114 and the plurality of taxels 102 may be provided to apply a linear force with a required angle to determine the ground truth. In some configurations, the tactile sensor pad 106 may be associated with numerous F/T sensors that may each be associated with a respective taxel of the plurality of taxels 102.

II. Overview of the Tactile Sensor Calibration Application

Components of the tactile sensor calibration application 110 will now be described according to an exemplary embodiment and with continued reference to FIG. 1. In an exemplary embodiment, the tactile sensor calibration application 110 may be stored on the memory 120 and may be executed by the processor 116 of the external server 108. In another embodiment, the tactile sensor calibration application 110 may be executed through the processor 122 of the robotic computing system 112 based on storage of the application 110 on a storage unit (not shown) of the robotic computing system 112 and/or based on wireless communications between the communications unit 124 of the robotic computing system 112 and the communications unit 118 of the external server 108.

Figure 3:
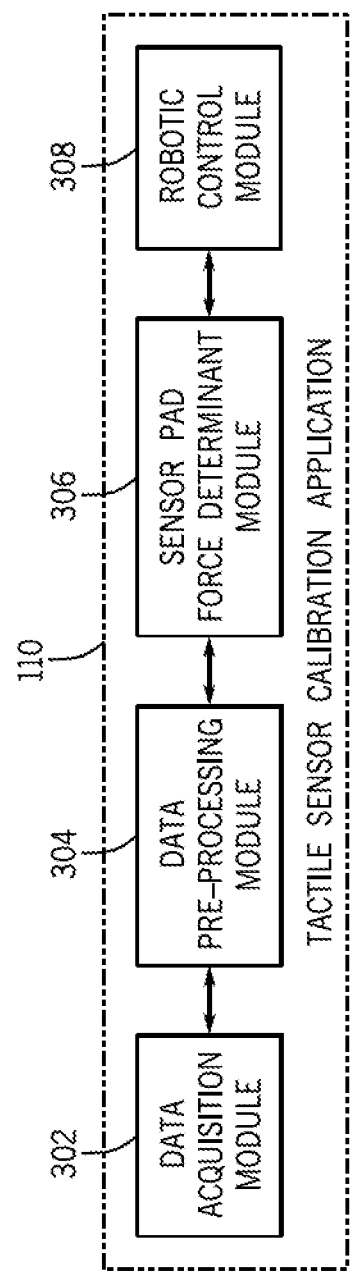
FIG. 3 is schematic overview of the tactile sensor calibration application according to an exemplary embodiment of the present disclosure.

FIG. 3 is a schematic overview of the tactile sensor calibration application 110 according to an exemplary embodiment of the present disclosure. In an exemplary embodiment, the tactile sensor calibration application 110 may include a plurality of modules 302-308 that may be configured to provide tactile sensor calibration of the plurality of taxels 102 disposed upon the tactile sensing surface 104 of the tactile sensor pad 106. The plurality of modules 302-308 may include a data acquisition module 302, a data pre-processing module 304, a sensor pad force determinant module 306, and a robotic control module 308. However, it is appreciated that the tactile sensor calibration application 110 may include one or more additional modules and/or sub-modules that are included in lieu of the modules 302-308.

Data Acquisition

As discussed above, the tactile sensor calibration application 110 may be configured to use the F/T sensor 114 as a ground truth to calibrate the tactile sensor pad 106. In one configuration, sensor force output from the F/T sensor 114 may be output in the form of Newtons in a z-direction and may be packaged as force data. The force data may be based on force output measurements that are sensed by the F/T sensor 114 and may be output to the robotic computing system 112. In one embodiment, the data acquisition module 302 of the tactile sensor calibration application 110 may be configured to utilize the communications unit 118 to communicate with the robotic computing system 112 to acquire the force data. In one configuration, the force data may be acquired at 60 Hz.

Additionally, the tactile sensor calibration application 110 may be configured to use the plurality of taxels 102 to recognize three dimensional displacement and provide a measurement that is related to sensed force by the taxels that may output as tactile data to the robotic computing system 112. In one configuration, sensor force output from the plurality of taxels 102 may be defined as the sum of all taxel measurements that are associated with the tactile sensor pad 106 in a z-direction. In one embodiment, the data acquisition module 302 of the tactile sensor calibration application 110 may be configured to utilize the communications unit 118 to communicate with the robotic computing system 112 to acquire the tactile data. In one configuration, the tactile data may be acquired at 97 Hz.

In an exemplary embodiment, upon acquiring the force data output by the F/T sensor 114 and the tactile data output by the plurality of taxels 102, the data acquisition module 302 may be configured to communicate the force data and the tactile data to the data pre-processing module 304 of the tactile sensor calibration application 110.

Data Pre-Processing

In an exemplary embodiment, the force data acquired from the F/T sensor 114 and the tactile data acquired from the plurality of taxels 102 may be acquired at different frequencies with different starting and ending moments (e.g., at different timesteps). The data pre-processing module 304 may be configured to analyze the force data and the tactile data together. The data pre-processing module 304 may be configured to align the force data and the tactile data and may interpolate the force data and tactile data. Accordingly, the force data associated with the force measurement ground truth sensed by the F/T sensor 114 and the tactile data associated with the measured forces on the plurality of taxels 102 may be interpolated to match the amount of data points.

According to one aspect, the data pre-processing module 304 may execute data format processing as part of data pre-processing. In one configuration, the force data may be acquired in a particular electronic data file format (ex., .csv file) that may contain sets of information, having n number of taxels (e.g., 240 taxels) each with a "point" which is a three-dimensional (3D) structure with a value for x, y and z. The values for x, y and z may respectively correspond to each axis sensor reading of the plurality of taxels 102.

In one or more embodiments, the data pre-processing module 304 may be configured to electronically convert the file into a new file of a particular electronic data file format (e.g., a new .csv file) that may contain a three dimensional matrix of a particular size (3×240×n), where n may include the number of samples. The data pre-processing module 304 may be configured to execute data alignment as part of the data pre-processing.

As discussed above, the sensor force output from the F/T sensor 114 may be output in Newtons in the z-direction and included within the force data. Additionally, the sensor force output from the plurality of taxels 102 may be defined as the sum of all taxel measurements that are associated with the tactile sensor pad 106 in the z-direction. In one embodiment, the data pre-processing module 304 may be configured to execute data alignment by primarily analyzing data associated with an initial interaction and data associated with a last interaction. The data pre-processing module 304 may thereby determine the respective starting and ending moments by setting a threshold for each data set. As an illustrative example, the data pre-processing module 304 may be configured to start with a threshold for the F/T sensor 114 of 0.5 N and for each tactile sensor of 1500.

With the cropped data, the data pre-processing module 304 may be configured to match the number of data points for both data sets. In one embodiment, to match the F/T sensor measurements and the taxel measurements, the data pre-processing module 304 may analyze the measurements based on a configuration that the tactile sensor pad 106 is disposed upon the robotic hand 200 and that the F/T sensor 114 may be pressed against one or more of the plurality of taxels 102. Accordingly, since the F/T sensor 114 may be pressed against one or more of the plurality of taxels 102, the data pre-processing module 304 may analyze a sum of forces on each axis of the tactile sensor pad 106. In one embodiment, the sum of the forces for a frame of the tactile sensors may be calculated as:

$$\begin{bmatrix} 0 \\ -F_r \\ N \end{bmatrix} + \begin{bmatrix} 1 & 0 & 0 \\ 0 & \sin(\theta) & -\cos(\theta) \\ 0 & \cos(\theta) & \sin(\theta) \end{bmatrix} \begin{bmatrix} 0 \\ F_y^B F_z^B \end{bmatrix} = 0$$

In an exemplary embodiment, to process a transformation on the z-axis, the F/T sensor 114 may be configured to be pressed perpendicular to a respective taxel ($\theta=90°$) to have $N=-F_{ext}$. The F/T sensor 114 may be configured to be pressed with the respective taxel at an angle ($\theta=80°$) in which friction is enough to keep a static equilibrium of forces.

In one configuration, the data pre-processing module 304 may be configured to take the data set with the smaller sample set (e.g., force data from the F/T sensor 114), and may perform a 1D cubic interpolation on the data set. The data pre-processing module 304 may thereby be configured to sample the same for an amount sample as the larger sample set (tactile data from the plurality of taxels 102). The data pre-processing module 304 may accordingly align the initial data. As such, in one embodiment, the data pre-processing module 304 may be configured to perform a 1D cubic interpolation on the force data provided by the F/T sensor 114. The data pre-processing module 304 may also be configured to analyze a same sample size of tactile data that is provided by the plurality of taxels 102 as the sample size of force data.

In one embodiment, the data pre-processing module 304 may be further configured to correlate for different thresholds to further align the force data and tactile data provided by both types of sensors. The data pre-processing module 304 may be configured to modify the threshold of the tactile sensor measurement which may change for the starting and ending point of the cropped data. As the data pre-processing module 304 modifies the threshold, the data pre-processing module 304 may be configured to compute an r2-score or coefficient of determination to analyze the correlation between the two data sets associated with the respective sensor types. For a given threshold, the r2-score may be maximized when both data sets are aligned to correlate for different thresholds.

In one or more embodiments, the data pre-processing module 304 may be configured to select an optimum threshold to determine the initial aligned data. In one embodiment, upon pre-processing of the force data and the tactile data, the data pre-processing module 304 may be configured to communicate data associated with the pre-processed data to the sensor pad force determinant module 306 of the tactile sensor calibration application 110.

Determining Force Measurements Associated with the Tactile Sensor Pad

In an exemplary embodiment, upon receiving data associated with the pre-processed data, the sensor pad force determinant module 306 may be configured to analyze the pre-processed data. The sensor pad force determinant module 306 may be configured to determine a linear regression that may transform the tactile measurement into a value that is indicative of a measured amount of force of each taxel on each direction. In one configuration, the plurality of taxels 102 may correlate the 3D displacement into a measurement that is related to force. The sensor pad force determinant module 306 may be configured to analyze the calibration of all of the plurality of taxels 102 that are each configured to measure some variable related to force that are included upon the tactile sensor pad 106.

In one embodiment, the sensor pad force determinant module 306 may be configured to consider the total measurement of the tactile sensor pad 106 in which the sum of all of the taxels readings are in a corresponding axis. Given the tactile sensor pad with n taxels, the measurement of the tactile sensor pad $\Gamma_p$ may be computed as:

$$\Gamma_p = \sum_n (f_t - f_t^{rest})$$

where $f_t \in R^3$ is the measurement of each taxel on each direction and $f_t^{rest} \in R^3$ is the offset that each taxel may have when idle (e.g., when not sensing any force).

Based on the tactile data provided by the plurality of taxels 102 displaced upon the tactile sensing surface 104 of the tactile sensor pad 106 and the force data provided by the F/T sensor 114, the sensor pad force determinant module 306 may be configured to compute a linear regression that may transform the measurement of the tactile sensor pad 106 into force. In one embodiment, a Huber regression may be used to match a linear regression and remove outliers so that when no force is applied (as sensed by the F/T sensor 114), no force should be measured by the tactile sensor pad 106. Accordingly, $n_x=n_y=n_z=0$ and a slope of the Huber regression may be utilized to transform the measurement of the tactile sensor pad 106 into a value that is indicative of a measured amount of force of each taxel on each direction of the tactile sensor pad 106 such that:

$$F_{ft} = \begin{bmatrix} m_x & 0 & 0 \\ 0 & m_y & 0 \\ 0 & 0 & m_z \end{bmatrix} \Gamma_p + \begin{bmatrix} n_x \\ n_y \\ n_z \end{bmatrix}$$

where m refers to the slope of the transformation and $n_x$, $n_y$, $n_z$, are the intercept points of the linear regression. It is appreciated that alternative regressions may be computed by the sensor pad force determinant module 306, such as Polynomial regressions (linear, quadratic and cubic) and Theil-Sen regressions.

In one or more embodiments, a main difference between the tactile sensor pad 106 that may be configured as a curved fingertip pad and the tactile sensor pad that is configured as a flat pad that may include flat fingers of the robotic hand 200 is a difference in orientation in which the plurality of taxels 102 may be pointing (e.g., the flat fingertips may have all taxels pointing upwards). To account for the rotation of the plurality of taxels 102 that may be disposed upon curved fingers of the robotic hand 200, the sensor pad force determinant module 306 may be configured to bring all the measured forces into a fixed frame. Upon bringing all of the measured forces into the fixed frame, the sensor pad force determinant module 306 may be configured to sum up the measured forced. Accordingly, each of the plurality of taxels 102 may be configured to be rotated by a rotation matrix R which may include values that are given by a Unified Robot Description Format (URDF) of each curved finger of the robotic hand 200.

The URDF of the curved finger may thereby provide roll-pitch-yaw values for the 3D rotation. In one embodiment, the force of each taxel in the inertial frame may be given by:

$$f_i = R(f_t - f_t^{rest})$$

and the normal vector may be given by:

$$n_i = R[0\ 0\ 1]^T$$

With these terms, the total force applied into the sensor may be given by:

$$\Gamma_p = \sum_{i=1}^{n} f_i$$

and the total normal force of the pad may be:

$$n_p = \left(\sum_{i=1}^{n} n_i \cdot f_i\right) \text{diag}\left(\sum_{i=1}^{n} f_i\right)^{-1}$$

Center of Pressure

A center of pressure of an applied force may be computed based on the tactile data received from one or more of the plurality of taxels 102 for each segment that is associated with each individual interaction. In one embodiment, the sensor pad force determinant module 306 may be configured to consider the measurements from some or all of the plurality of taxels 102 for the tactile sensor pad 106. A sum of some or all taxels' 3D location on the tactile sensor pad 106 may be computed and may be weighted by their measurements over the total measurement of the tactile sensor pad 106. In one embodiment, the center of pressure may be given by:

$$\begin{bmatrix} x_{cop} \\ y_{cop} \\ z_{cop} \end{bmatrix} = \left(\sum_{i=1}^{n} \begin{bmatrix} x_i & 0 & 0 \\ 0 & y_i & 0 \\ 0 & 0 & z_i \end{bmatrix} f_i\right) \text{diag}\left(\sum_{i=1}^{n} f_i\right)^{-1}.$$

In an exemplary embodiment, upon computing the center of pressure, the sensor pad force determinant module 306 may be configured to process a regression map. The regression map may be analyzed to convert the tactile sensor pad's measurements into Newtons to indicate the measure of force that may be based on the location of the applied force upon the tactile sensing surface 104 of the tactile sensor pad 106. As such, the regression map may provide the conversion from tactile measurements sensed by one or more of the plurality of taxels 102 into Newtons based on the computed linear regression to transform the tactile measurements of the tactile sensor pad 106 into a measurement of force. Accordingly, the tactile sensor calibration application 110 may be configured to characterize a tactile sensor base of forces applied over an area that spans several taxels and may perform a calibration based on the location of where the force is applied.

III. Methods Executed by the Tactile Sensor Calibration Application

Figure 4:
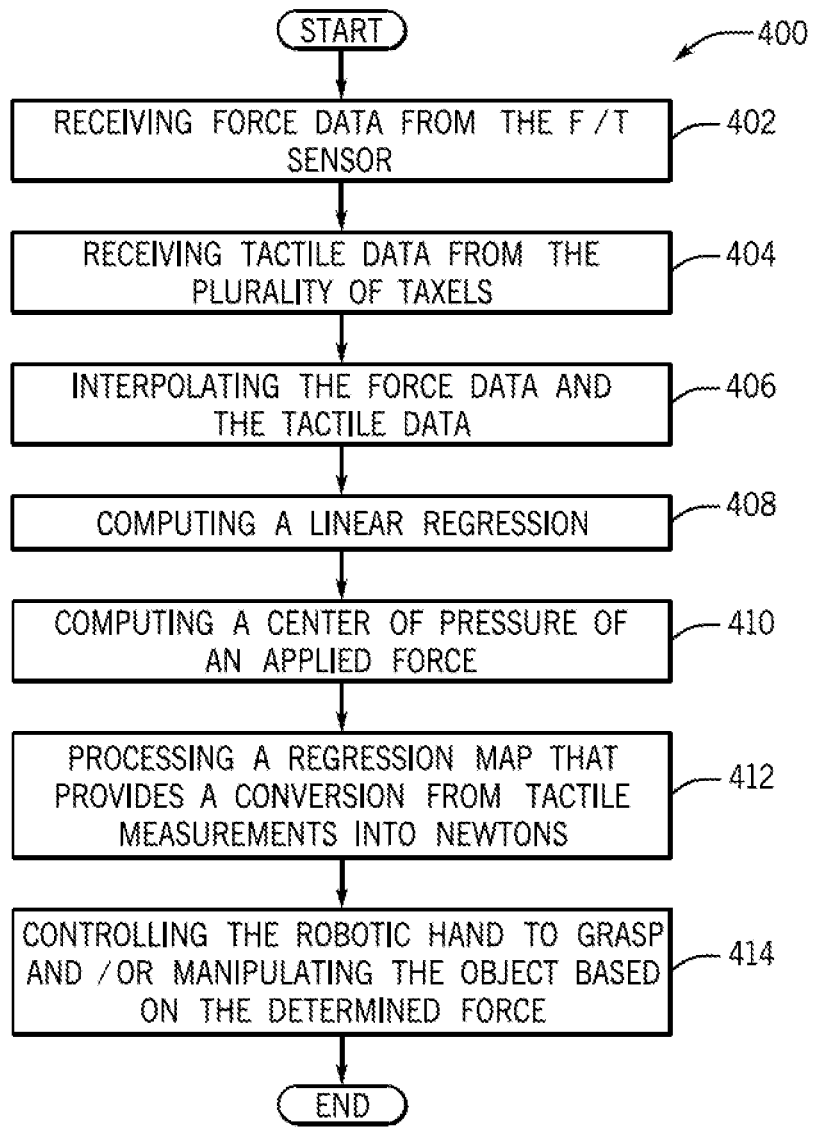
FIG. 4 is a process flow diagram of a method for determining an amount of force that is absorbed by the tactile sensor pad and controlling the robotic hand to grasp and/or manipulate an object according to an exemplary embodiment of the present disclosure.

FIG. 4 is a process flow diagram of a method 400 for determining an amount of force that is absorbed by the tactile sensor pad 106 and controlling the robotic hand 200 to grasp and/or manipulate an object based on the determined amount of force according to an exemplary embodiment of the present disclosure. FIG. 4 will be described with reference to the components of FIG. 1, FIG. 2, and FIG. 3 though it is to be appreciated that the method 400 of FIG. 4 may be used with other systems/components. The method 400 may begin at block 402, wherein the method 400 may include receiving force data from the F/T sensor 114.

In an exemplary embodiment, the data acquisition module 302 of the tactile sensor calibration application 110 may be configured to utilize the communications unit 118 to communicate with the robotic computing system 112 to acquire the force data. In one configuration, the force data may be acquired at 60 Hz. As discussed, the force data may be used a ground truth to calibrate the tactile sensor pad 106.

The method 400 may proceed to block 404, wherein the method 400 may include receiving tactile data from the plurality of taxels 102. In one embodiment, the data acquisition module 302 of the tactile sensor calibration application 110 may be configured to utilize the communications unit 118 to communicate with the robotic computing system 112 to acquire the tactile data. In one configuration, the tactile data may be acquired at 97 Hz. In one configuration, the tactile data may be defined as the sum of all taxel measurements that are associated with the tactile sensor pad 106.

The method 400 may proceed to block 406, wherein the method 400 may include interpolating the force data and the tactile data. In an exemplary embodiment, upon acquiring the force data output by the F/T sensor 114 and the tactile data output by the plurality of taxels 102, the data acquisition module 302 may be configured to communicate the force data and the tactile data to the data pre-processing module 304 of the tactile sensor calibration application 110. Since the force data acquired from the F/T sensor 114 and the tactile data acquired from the plurality of taxels 102 may be acquired at different frequencies with different starting and ending moments (e.g., at different timesteps) of sensing the force data and the tactile data, the data pre-processing module 304 may be configured to analyze the force data and may interpolate the force data and tactile data to match the amount of data points.

In an exemplary embodiment, the data pre-processing module 304 may be configured to execute data alignment as part of the data pre-processing by primarily analyzing data associated with an initial interaction and data associated with a last interaction. The data pre-processing module 304 may thereby determine the respective starting and ending moments by setting a threshold for each data set. The data pre-processing module 304 may be further configured to match the number of data points for both data sets and align the data, as discussed in detail above. Upon aligning the force data and the tactile data, the data pre-processing module 304 may be configured to communicate data associated with the pre-processed data to the sensor pad force determinant module 306 of the tactile sensor calibration application 110.

The method 400 may proceed to block 408, wherein the method 400 may include computing a linear regression. In an exemplary embodiment, the sensor pad force determinant module 306 may be configured to divide the matched data points of the pre-processed data into individual interactions and may compute a linear regression for each segment that is associated with each individual interaction. The linear regression may transform the tactile measurements included within the tactile data provided by the plurality of taxels 102 into a value that is indicative of a measured amount of force of each taxel on each direction. In one embodiment, to account for the rotation of the plurality of taxels 102 that may be disposed upon curved fingers of the robotic hand 200, the sensor pad force determinant module 306 may be configured to bring all the measured forces into a fixed frame in which they may be summed up.

The method 400 may proceed to block 410, wherein the method 400 may include computing a center of pressure of an applied force. In one embodiment, the sensor pad force determinant module 306 may be configured to consider the measurements from some or all of the plurality of taxels 102 for the tactile sensor pad 106. A sum of some or all taxels' 3D location on the tactile sensor pad 106 may be computed and weighted by their measurements over the total measurement of the tactile sensor pad 106. The center of pressure of an applied force upon the tactile sensing surface 104 of the tactile sensor pad 106 may thereby be computed based on the weighting of the measurements from some or all of the plurality of taxels 102 of the tactile sensor pad 106.

The method 400 may proceed to block 412, wherein the method 400 may include processing a regression map that provides a conversion from tactile measurements into Newtons. In an exemplary embodiment, the upon computing the center of pressure, the sensor pad force determinant module 306 may be configured to process a regression map. The regression map may be analyzed to convert the tactile sensor pad's measurements into Newtons to indicate the measure of force that may be based on the location of the applied force upon the tactile sensing surface 104 of the tactile sensor pad 106. Upon indicating the measure of force in Newtons, the sensor pad force determinant module 306 may be configured to communicate respective data regarding the measure of force to the robotic control module 308 of the tactile sensor calibration application 110.

The method 400 may proceed to block 414, wherein the method 400 may include controlling the robotic hand 200 to grasp and/or manipulate the object based on the determined force. In an exemplary embodiment, the robotic control module 308 may be configured to analyze the determined force that is absorbed by the tactile sensor pad 106 that is provided in Newtons and particular locations of applied force upon the tactile sensor pad 106.

In one embodiment, the robotic control module 308 may be configured to access the memory 120 of the external server 108 to retrieve and analyze one or more pre-trained datasets to query and retrieve force values (e.g., in Newtons) that may be associated with requisite grasping and/or manipulation forces that may be associated with the robotic hand 200 to properly grasp and manipulate a particular object. The force values retrieved from the one or more pre-trained datasets may be compared against the determined force absorbed by the tactile sensor pad 106 (as determined at block 412) to determine if forces extracted by the robotic hand 200 are to be adjusted for grasping and manipulation of the object. In one embodiment, the robotic control module 308 may compare the determined force that is absorbed by the tactile sensor pad 106 that is provided in Newtons against the retrieved force values to determine if there is a delta between forces that is above a pre-determined force value threshold that may indicate that the forces exerted by the robotic hand 200 are to be adjusted to properly grasp and/or manipulate the particular object.

If it is determined that a difference between the determined force that is absorbed by the tactile sensor pad 106 that is provided in Newtons and the retrieved force values from one or more pre-trained datasets are above the pre-determined force value threshold, the robotic control module 308 may be configured to provide electronic commands to the robotic computing system 112 to electronically control the robotic hand 200 to adjust forces exerted by one or more portions of the robotic hand 200. This functionality may enable the robotic hand 200 to properly grasp and/or manipulate the object as determined based on the comparison of the determined force absorbed by the tactile sensor pad 106 and the retrieved force values that were included within the one or more pre-trained datasets stored upon the memory 120 of the external server 108.

Figure 5:
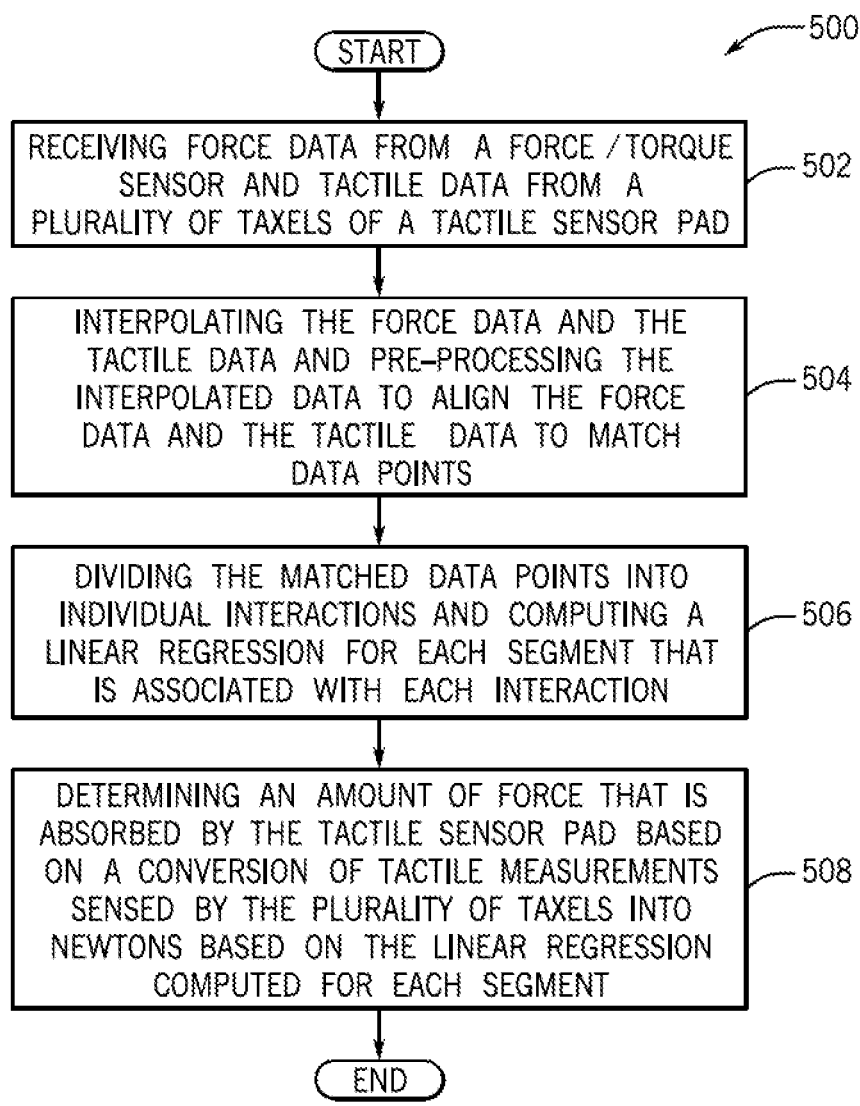
FIG. 5 a process flow diagram of a method for providing tactile sensor calibration according to an exemplary embodiment of the present disclosure.

FIG. 5 is a process flow diagram of a method 500 for providing tactile sensor calibration according to an exemplary embodiment of the present disclosure. FIG. 5 will be described with reference to the components of FIG. 1, FIG. 2, and FIG. 3 though it is to be appreciated that the method 500 of FIG. 5 may be used with other systems/components. The method 500 may begin at block 502, wherein the method 500 may include receiving force data from a force/torque sensor 114 and tactile data from a plurality of taxels 102 of a tactile sensor pad 106.

The method 500 may proceed to block 504, wherein the method 500 may include interpolating the force data and the tactile data and pre-processing the interpolated data to align the force data and the tactile data to match data points. The method 500 may proceed to block 506, wherein the method 500 may include dividing the matched data points into individual interactions and computing a linear regression for each segment that is associated with each interaction. In one embodiment, a center of pressure of an applied force is computed based on the linear regression for each segment. The method 500 may proceed to block 508, wherein the method 500 may include determining an amount of force that is absorbed by the tactile sensor pad based on a conversion of tactile measurements sensed by the plurality of taxels 102 into Newtons based on the linear regression computed for each segment.

Figure 6:
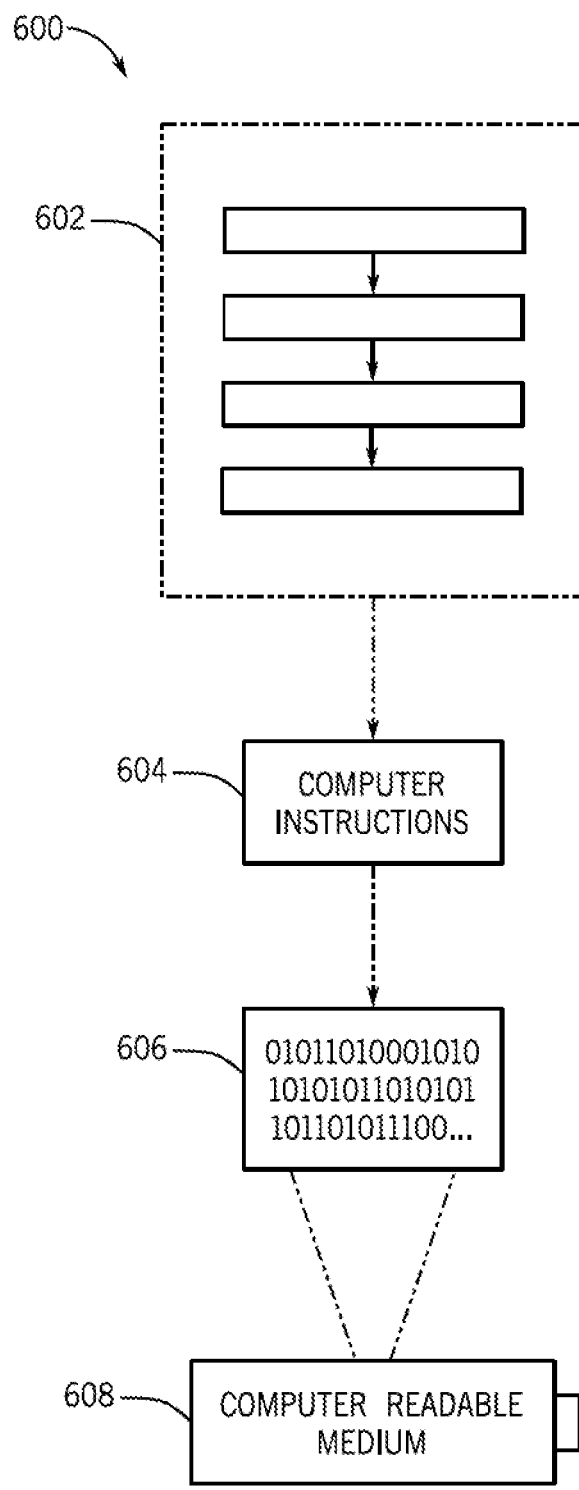
FIG. 6 is an illustration of an example computer-readable medium or computer-readable device including processor-executable instructions configured to embody one or more of the provisions set forth herein according to an exemplary embodiment of the present disclosure.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 400 of FIG. 4 and/or the method 500 of FIG. 5. In another aspect, the processor-executable computer instructions 604 may be configured to implement a system, such as the system included within the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
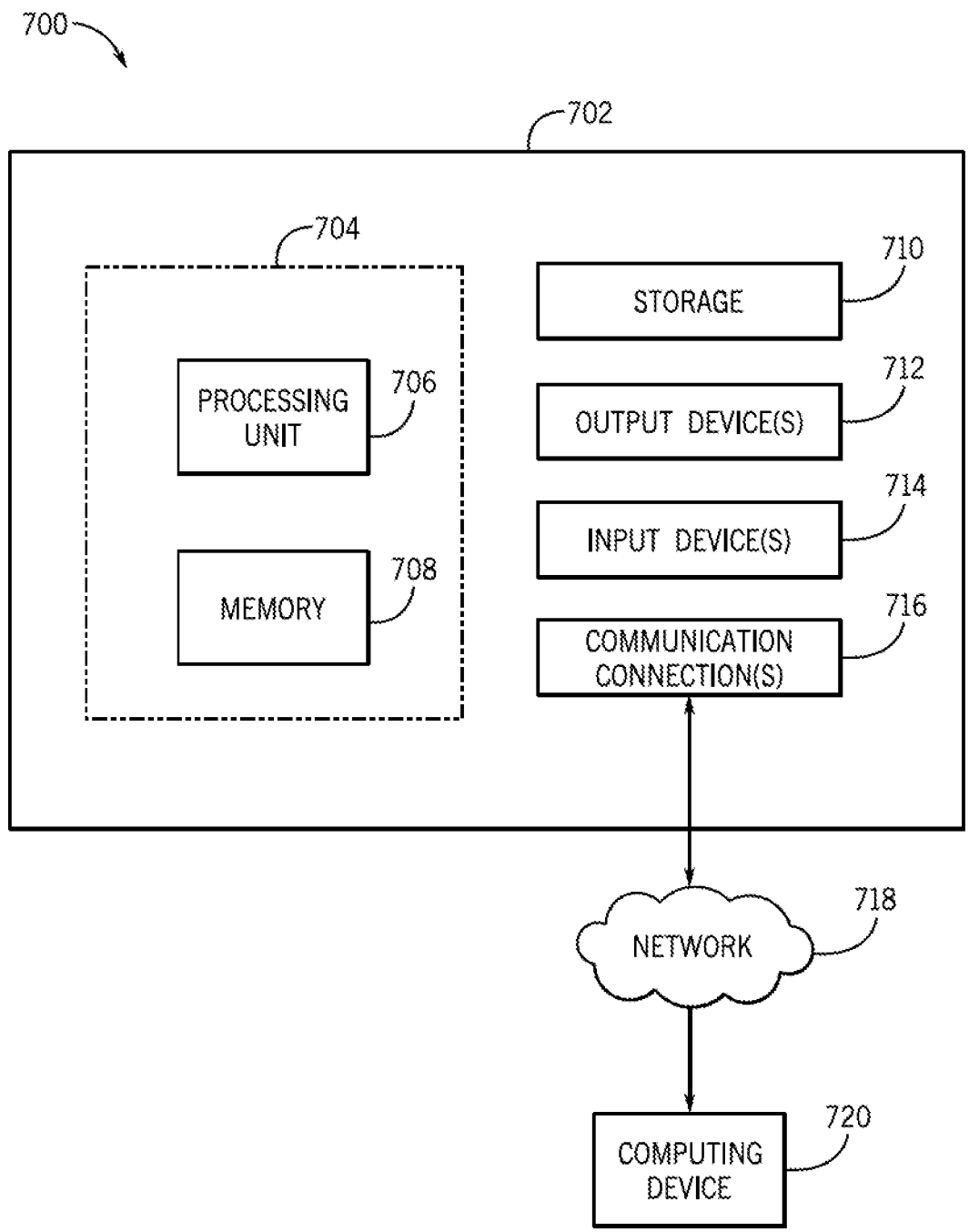
FIG. 7 is an illustration of an example computing environment where one or more of the provisions set forth herein are implemented according to an exemplary embodiment of the present disclosure.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 702 configured to implement one aspect provided herein. In one configuration, the computing device 702 includes at least one processing unit 706 and memory 708. Depending on the exact configuration and type of computing device, memory 708 may be volatile, such as RAM, non-volatile, such as ROM, flash memory, etc., or a combination of the two. This configuration is illustrated in FIG. 7 by dashed line 704.

In other aspects, the computing device 702 includes additional features or functionality. For example, the computing device 702 may include additional storage such as removable storage or non-removable storage, including, but not limited to, magnetic storage, optical storage, etc. Such additional storage is illustrated in FIG. 7 by storage 710. In one aspect, computer readable instructions to implement one aspect provided herein are in storage 710. Storage 710 may store other computer readable instructions to implement an operating system, an application program, etc. Computer readable instructions may be loaded in memory 708 for execution by processing unit 706, for example.

The term "computer readable media" as used herein includes computer storage media. Computer storage media includes volatile and nonvolatile, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 702. Any such computer storage media is part of the computing device 702.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 702 includes input device(s) 714 such as keyboard, mouse, pen, voice input device, touch input device, infrared cameras, video input devices, or any other input device. Output device(s) 712 such as one or more displays, speakers, printers, or any other output device may be included with the computing device 702. Input device(s) 714 and output device(s) 712 may be connected to the computing device 702 via a wired connection, wireless connection, or any combination thereof. In one aspect, an input device or an output device from another computing device may be used as input device(s) 714 or output device(s) 712 for the computing device 702. The computing device 702 may include communication connection(s) 716 to facilitate communications with one or more other devices 720, such as through network 718, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for providing tactile sensor calibration, comprising:
   receiving force data from a force/torque sensor and tactile data from a plurality of taxels of a tactile sensor pad;
   interpolating the force data and the tactile data and pre-processing the interpolated data to align the force data and the tactile data to match data points;
   dividing the matched data points into individual interactions and computing a linear regression for each segment that is associated with each interaction, wherein a center of pressure of an applied force is computed based on the linear regression for each segment;
   determining an amount of force that is absorbed by the tactile sensor pad based on a conversion of tactile measurements sensed by the plurality of taxels into Newtons based on the linear regression computed for each segment; and
   calibrating the tactile sensor pad using the linear regression computed for each segment to enable force measurement across the plurality of taxels of the tactile sensor pad; and
   controlling a robotic hand that includes the tactile sensor pad based on the calibrated force measurements.

2. The computer-implemented method of claim 1, wherein receiving the force data includes receiving a value indicative of force in Newtons in a z-direction of the tactile sensor pad.

3. The computer-implemented method of claim 1, wherein receiving the tactile data includes the receiving a sensor force output that defines a sum of all taxel measurements of the plurality of taxels in a z-direction of the tactile sensor pad.

4. The computer-implemented method of claim 1, wherein interpolating the force data and the tactile data and pre-processing the interpolated data includes aligning the force data and the tactile data by determining respective starting and ending moments of each interaction to match a number of data points of the force data and the tactile data.

5. The computer-implemented method of claim 4, wherein interpolating the force data and the tactile data and pre-processing the interpolated data includes performing a cubic interpolation on the force data and analyzing a sample size of the tactile data as a same size of the force data received from force/torque sensor.

6. The computer-implemented method of claim 5, further including using the data received from the force/torque sensor as a ground truth to calibrate the tactile sensor pad, wherein the ground truth enables more accurate force measurements than calibrating the tactile sensor pad without the force/torque sensor data.

7. The computer-implemented method of claim 5, wherein dividing the matched data points into individual interactions and computing the linear regression for each segment includes evaluating a slope of the linear regression and intercept points of the linear regression and transforming the tactile measurements that are derived from the tactile data into a value that is indicative of a measured amount of force of each taxel on each direction of the tactile sensor pad.

8. The computer-implemented method of claim 7, wherein determining an amount of force that is absorbed by the tactile sensor pad includes processing a regression map that provides the conversion of tactile measurements sensed by the plurality of taxels into Newtons based on the computed linear regression, wherein the regression map is used during the calibration of the tactile sensor pad.

9. The computer-implemented method of claim 8, wherein a tactile sensor base of forces is applied over an area that spans several taxels and the tactile sensor calibration is performed based on a location of where the force is applied upon the tactile sensor pad, wherein the calibration enables accurate force measurement without requiring individual calibration of each taxel.

10. A system for providing tactile sensor calibration, comprising:
    a memory storing instructions when executed by a processor cause the processor to:
    receive force data from a force/torque sensor and tactile data from a plurality of taxels of a tactile sensor pad;
    interpolate the force data and the tactile data and pre-processing the interpolated data to align the force data and the tactile data to match data points;
    divide the matched data points into individual interactions and computing a linear regression for each segment that is associated with each interaction, wherein a center of pressure of an applied force is computed based on the linear regression for each segment;
    determine an amount of force that is absorbed by the tactile sensor pad based on a conversion of tactile measurements sensed by the plurality of taxels into Newtons based on the linear regression computed for each segment; and
    calibrate the tactile sensor pad using the linear regression computed for each segment to enable force measurement across the plurality of taxels of the tactile sensor pad; and
    control a robotic hand that includes the tactile sensor pad based on the calibrated force measurements.

11. The system of claim 10, wherein receiving the force data includes receiving a value indicative of force in Newtons in a z-direction of the tactile sensor pad.

12. The system of claim 10, wherein receiving the tactile data includes the receiving a sensor force output that defines a sum of all taxel measurements of the plurality of taxels in a z-direction of the tactile sensor pad.

13. The system of claim 10, wherein interpolating the force data and the tactile data and pre-processing the interpolated data includes aligning the force data and the tactile data by determining respective starting and ending moments of each interaction to match a number of data points of the force data and the tactile data.

14. The system of claim 13, wherein interpolating the force data and the tactile data and pre-processing the interpolated data includes performing a cubic interpolation on the force data and analyzing a sample size of the tactile data as a same size of the force data received from force/torque sensor.

15. The system of claim 14, further including using the data received from the force/torque sensor as a ground truth to calibrate the tactile sensor pad, wherein the ground truth enables more accurate force measurements than calibrating the tactile sensor pad without the force/torque sensor data.

16. The system of claim 14, wherein dividing the matched data points into individual interactions and computing the linear regression for each segment includes evaluating a slope of the linear regression and intercept points of the linear regression and transforming the tactile measurements that are derived from the tactile data into a value that is indicative of a measured amount of force of each taxel on each direction of the tactile sensor pad, which provides a basis for the calibration of the tactile sensor pad.

17. The system of claim 16, wherein determining an amount of force that is absorbed by the tactile sensor pad includes processing a regression map that provides the conversion of tactile measurements sensed by the plurality of taxels into Newtons based on the computed linear regression, wherein the regression map is used during the calibration of the tactile sensor pad.

18. The system of claim 17, wherein a tactile sensor base of forces is applied over an area that spans several taxels and the tactile sensor calibration is performed based on a location of where the force is applied upon the tactile sensor pad, wherein the calibration enables accurate force measurement without requiring individual calibration of each taxel.

19. A non-transitory computer readable storage medium storing instructions that when executed by a computer, which includes a processor performs a method, the method comprising:

receiving force data from a force/torque sensor and tactile data from a plurality of taxels of a tactile sensor pad;

interpolating the force data and the tactile data and pre-processing the interpolated data to align the force data and the tactile data to match data points;

dividing the matched data points into individual interactions and computing a linear regression for each segment that is associated with each interaction, wherein a center of pressure of an applied force is computed based on the linear regression for each segment;

determining an amount of force that is absorbed by the tactile sensor pad based on a conversion of tactile measurements sensed by the plurality of taxels into Newtons based on the linear regression computed for each segment; and calibrating the tactile sensor pad using the linear regression computed for each segment to enable force measurement across the plurality of taxels of the tactile sensor pad; and controlling a robotic hand that includes the tactile sensor pad based on the calibrated force measurements.

20. The non-transitory computer readable storage medium of claim 19, wherein a tactile sensor base of forces is applied over an area that spans several taxels and a tactile sensor calibration is performed based on a location of where the force is applied upon the tactile sensor pad, wherein the calibration enables accurate force measurement without requiring individual calibration of each taxel, resulting in improved efficiency and accuracy for robotic hand control.

* * * * *